Aug. 8, 1950     P. N. ERICKSON     2,517,775
TOWING APPARATUS
Filed June 21, 1948

*INVENTOR.*
PAUL N. ERICKSON
BY
Whittemore Hulbert & Belknap
ATTORNEYS

Patented Aug. 8, 1950

2,517,775

UNITED STATES PATENT OFFICE 2,517,775

TOWING APPARATUS

Paul N. Erickson, Detroit, Mich., assignor to May Brothers Manufacturing Company, Inc., Detroit, Mich., a corporation of Michigan Application June 21, 1948, Serial No. 34,329

6 Claims. (Cl. 280—33.14)

The invention relates to towing apparatus of that type in which a cable or other flexible member has secured to opposite ends thereof attachment means for engaging with the bumper or other portion of a stalled vehicle, thereby forming a loop of the cable which may be connected to a towing vehicle.

It is the object of the invention to obtain a construction of this general type which is provided with quick attachment means adapted for engagement with various types of bumpers, and when thus engaged to be securely fastened. To this end the invention consists in the construction as hereinafter set forth.

As illustrated A is a cable and B are the attachment devices secured to the opposite ends of the cable. Each attachment device comprises a pair of members C and D, each being formed from a flat strip of metal having its outer end bent to form a hook E and its rear end bent into a segment F. The two segments F and F', respectively, on the members C and D are nested with each other to form in effect a hinge. This permits of spreading apart the members C and D so as to engage the hooks E thereof over a bumper above and below the same. The cable A is attached to the member D by extending it through registering apertures G in the segments F and F'. An abutment is then secured to the inner portion of the cable, preferably a collar H secured by swedging, which will operate to transfer the load to the cable.

It is essential that the members C and D should be securely held in position after the hooks thereof are engaged with the bumper, and it is also essential that the space between these members should be left unobstructed to accommodate bumpers of different designs. Both objects are attained by providing a U-shaped resilient member I, which passes around the segments F and F' and extends parallel to the members C and D for a portion of the length thereof. The ends of the U are provided with inturned hooks I' passing through apertures in said members C and D to form an attachment means thereto. The member I is preferably formed of a flat strip of metal fashioned to the desired shape and of sufficient thickness to apply the required amount of resilient pressure on the members C and D to normally hold the hooks E in contact with each other. It also functions to hold the segments F and F' in engagement and will yield sufficiently to spread the members C and D for engagement with a bumper of maximum cross-section. As it is located outside of the members C and D, it in no way obstructs the space between said members. Thus the members B when engaged with a bumper will clamp the same with sufficient force to preclude accidental disengagement. In addition to the collar H a second collar J is secured to the cable, preferably by swedging, outside the member B and will thus hold said member in substantially fixed positions on the cable.

Figure 5:
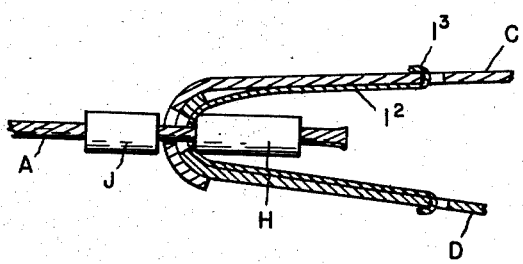
Fig. 5 is a section similar to Fig. 2 showing still another modification.

In Fig. 5 I have shown a modification in which a U-shaped resilient member I² is arranged inside of the members C and D but extends around adjacent to the inner faces thereof. The ends of the members I² are secured to the members C and D as, for instance, by portions I³ passing outward through apertures in said members and then return bent thereover. This will apply the desired resilient tension between the members C and D and will not interfere with the space therebetween.

Figure 2:
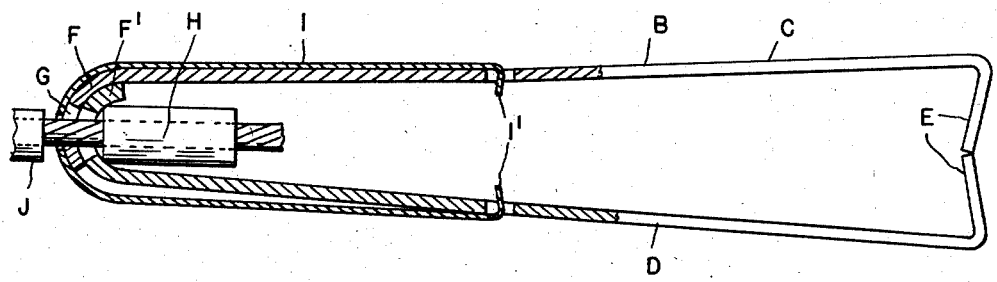
Fig. 2 is a longitudinal section through one of the attachment members.
Figure 3:
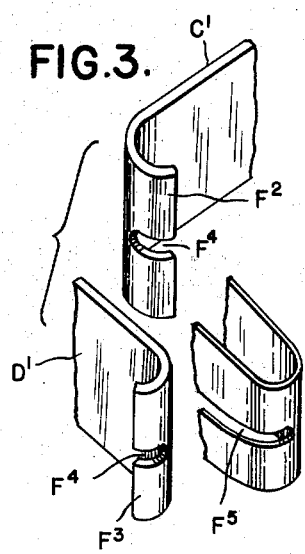
Fig. 3 is a perspective view of the several members of an attachment member slightly modified in construction from that shown in Fig. 2.
Figures 1, 4:
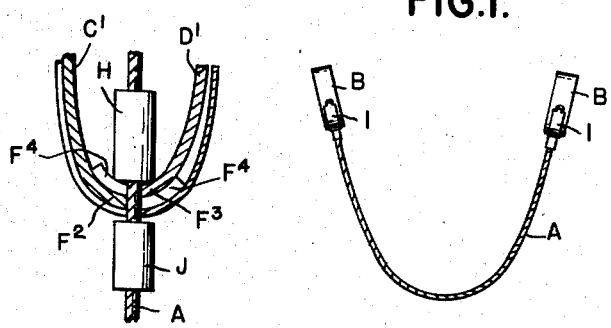
Fig. 1 is a plan view of my improved towing apparatus.
Fig. 4 is a section of the elements shown in Fig. 3 in assembled relation.

Another modification is shown in Figs. 3 and 4, in which the members C' and D' have their segments F² and F³ formed with entrance slots F⁴ for the cable A. This will permit the engagement of said members with the cable after the collars H and J have been secured to the latter. A U-shaped resilient member I⁴ is placed outside the members C' and D' and to avoid interference with the cable one side of said U-shaped member has a slot I⁵ therein. This will permit of assembling the parts as shown in Fig. 4.

With all of the modifications, the operation is the same and in each case the cable will be securely attached to the vehicle which is to be towed.

What I claim as my invention is:

1. A towing apparatus comprising a pair of members each having an inturned hook at its outer end and a segment at its inner end, said segments being nested with each other and having registering apertures therein, and a flexible draft member passing through said registering apertures and provided with an abutment at its inner end for transmitting draft to said members.

2. A towing apparatus comprising a pair of members each having an inturned hook at its outer end and a segment at its inner end, said segments being nested with each other and having registering apertures therein, a flexible draft member extending through said registered apertures and provided with an abutment at its inner end, and resilient means for urging said members towards each other.

3. A towing apparatus comprising a pair of members each having an inturned hook at its outer end and a segment at its inner end, said segments being nested with each other and having registering apertures therein, a flexible draft member extending through said registered apertures and provided with an abutment at its inner end, and means substantially clear of the space between said members for resiliently urging the same towards each other.

4. A towing apparatus comprising a pair of members each having an inturned hook at its outer end and a segment at its inner end, said segments being nested with each other and having registering apertures therein with an entrance slot to each aperture, a flexible draft member having an abutment at an end thereof, being engageable with said pair of members through the entrance slots thereof with said abutment inside said segments, and means substantially clear of the space between said members for resiliently urging the same towards each other.

5. A towing apparatus comprising a pair of members each having an inturned hook at its outer end and a segment at its inner end, said segments being nested with each other and having registering apertures therein, a resilient U-shaped member biased to move towards closed position, said member extending parallel to and forward of said nested segments into engagement with the aforesaid members to urge the same towards each other leaving substantially clear the space between said members, said resilient member also having an aperture in the bend thereof registering with the apertures in said nested segments, and a flexible draft member extending through said registering apertures and provided with an abutment at its inner end.

6. A towing apparatus comprising a pair of members each having an inturned hook at its outer end and a segment at its inner end, said segments being nested with each other and having registering apertures therein, a U-shaped resilient member biased to move towards closed position and arranged within to extend parallel to the aforesaid members around the nested portions thereof and forward therefrom with its forward ends secured to the respective members of the pair, being also apertured in registration with the apertures in said nested segments, and a flexible draft member extending through said apertures and provided with an abutment at its inner end.

PAUL N. ERICKSON.

REFERENCES CITED

The following references are of record in the file of this patent:

UNITED STATES PATENTS

| Number | Name | Date |
| --- | --- | --- |
| 1,292,881 | Rich | Jan. 28, 1919 |
| 1,384,835 | Hines et al. | July 19, 1921 |
| 2,196,117 | Lange | Apr. 2, 1940 |
| 2,319,521 | Schneider et al. | May 18, 1943 |